US010939173B2

(12) United States Patent
Bacon

(10) Patent No.: US 10,939,173 B2
(45) Date of Patent: Mar. 2, 2021

(54) SYSTEMS AND METHODS FOR ENCRYPTING VIDEO

(71) Applicant: Cox Communications, Inc., Atlanta, GA (US)

(72) Inventor: Kinney C. Bacon, Lawrenceville, GA (US)

(73) Assignee: Cox Communications, Inc., Atlanta, GA (US)

( * ) Notice: Subject to any disclaimer, the term of this patent is extended or adjusted under 35 U.S.C. 154(b) by 295 days.

(21) Appl. No.: 16/039,756

(22) Filed: Jul. 19, 2018

(65) Prior Publication Data
US 2020/0029124 A1 Jan. 23, 2020

(51) Int. Cl.
H04L 9/08 (2006.01)
H04L 29/06 (2006.01)
H04N 21/4623 (2011.01)
H04L 9/06 (2006.01)
H04L 9/32 (2006.01)

(52) U.S. Cl.
CPC ......... H04N 21/4623 (2013.01); H04L 9/065 (2013.01); H04L 9/0819 (2013.01); H04L 9/32 (2013.01); H04L 63/0428 (2013.01); H04L 63/08 (2013.01)

(58) Field of Classification Search
CPC ......... H04L 9/0819; H04L 9/065; H04L 9/32; H04L 9/0894; H04L 9/0618; H04L 63/0428; H04L 63/08; H04N 21/462; H04N 21/4623; H04N 21/4408
See application file for complete search history.

(56) References Cited

U.S. PATENT DOCUMENTS

| 2006/0143481 | A1* | 6/2006 | Morten | G11B 20/00884 713/193 |
| 2011/0010562 | A1* | 1/2011 | Kill | H04N 21/4181 713/189 |
| 2013/0129095 | A1* | 5/2013 | Fahrny | H04L 63/068 380/279 |
| 2018/0198762 | A1* | 7/2018 | Cline | H04L 63/0823 |
| 2020/0068244 | A1* | 2/2020 | Hunacek | H04N 21/63345 |

* cited by examiner

Primary Examiner — Nelson S. Giddins
(74) Attorney, Agent, or Firm — Eversheds Sutherland (US) LLP

(57) ABSTRACT

Systems, methods, and computer readable media for providing video encryption. A device may receive an unencrypted content stream. The device may identify an encryption key and an entitlement control message (ECM) from an encryption package. The device may encrypt the unencrypted content stream using the encryption key to obtain encrypted data. The device may generate an encryption stream that comprises the ECM and the encrypted data.

17 Claims, 6 Drawing Sheets

SYSTEMS AND METHODS FOR ENCRYPTING VIDEO

BACKGROUND

A variety of types of services exist for providing users with a service, including video services, data services, voice services, security services, and the like. A provider of network-based services may want to encrypt information that is transmitted in association with those services. However, some content may be generated locally, for example by a device in a network on or proximate to the premises of a customer. This may be the same network to which a receiver of the network-based services is also connected. This locally generated content may not be encrypted, exposing the content to security concerns.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
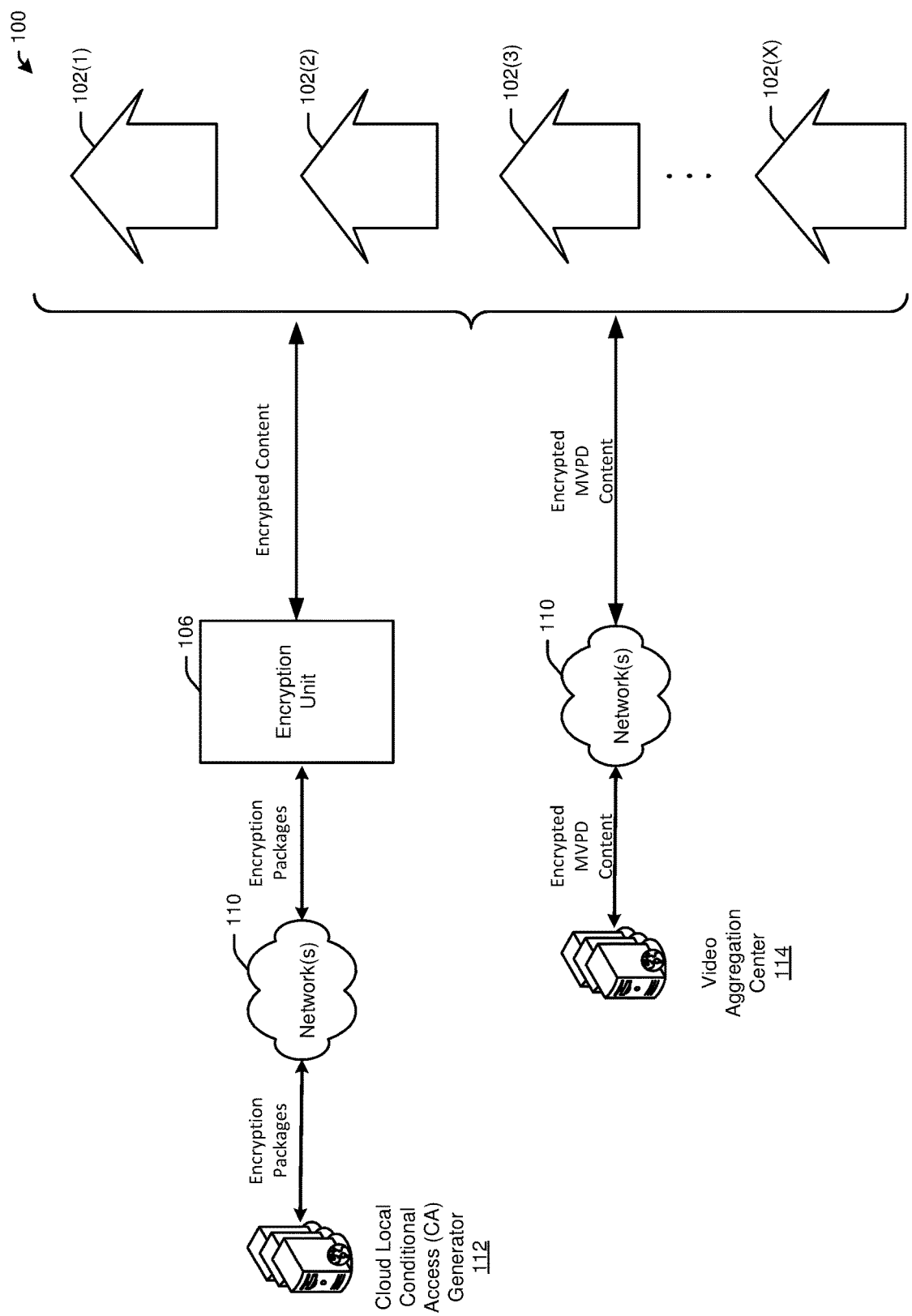
FIG. 1 is a schematic diagram of an illustrative architecture for providing video encryption, in accordance with one or more example embodiments of the disclosure.

This disclosure relates to, among other things, a system and associated methods and computer-readable media for providing video encryption.

A provider of network-based services, such as a multi-video program distributor (MVPD), may want to encrypt information that is sent to a receiver in the course of the provision of the network-based services. For example, an MVPD may provide one or more of video services, data services, voice services, home security services, billing services, application services, web services, and the like. Information that is sent to a receiver (e.g., a customer of a service provider) may be encrypted in order to ensure that only authorized users are allowed access to the provided service.

Unencrypted content (e.g., locally generated content) may be generated that is additional to MVPD content. There is a need to encrypt this unencrypted content in the same manner and/or in a manner similar to how the MVPD content is encrypted. Currently, when locally generated content is inserted into a video stream (e.g., when unencrypted, locally generated content is inserted into a stream of MVPD content, as may be the case for locally generated content generated by one or more security cameras in a Multiple Dwelling Unit (MDU) and/or in a Single Family Unit (SFU)), the locally generated content may not be encrypted. In some scenarios, a third party (e.g., an unauthorized third party, such as an individual and/or group that is not a user authorized to receive the content) may be able to view the unencrypted, locally generated content, for example by accessing the cable system.

MVPD content that is provided by a MVPD may be encrypted using a key management operation. In some embodiments, MVPD content may be encrypted at an MVPD's video aggregation center. Encrypted MVPD content may be transmitted from a video aggregation center to one or more authorized customers of the MVPD (e.g., via one or more networks, such as a cable access network, the Internet, and the like). Authorized users may be able to decrypt the received encrypted MVPD content in order to access the MVPD content. That is, authorized users may be granted conditional access (CA) by CA encryption technology used by the MVPD. The key management operation that is used to encrypt the MVPD content may be more difficult for third party bad actors to manipulate, for example because the key management operation and the encryption of the MVPD content occurs with a video aggregation center that the MVPD controls. In other words, the MVPD may control access to a video aggregation center, and the MVPD may implement one or more security protocols to protect the key management operation and the encryption process (e.g., by limiting access to the video aggregation center to authorized users, such as employees).

As noted above, one or more customers of an MVPD may desire to insert unencrypted content (e.g., locally generated content) into a received encrypted MVPD content stream. For example, an authorized user may want to insert locally generated security footage (e.g., captured at a location proximate to and/or associated with the authorized user) into encrypted MVPD content. In previous systems, however, if locally generated content is to be encrypted, the locally generated content needs to be delivered back to the video aggregation center (e.g., a headend), encrypted, and delivered back to the customer. This procedure creates additional expense and utilizes valuable bandwidth. Furthermore, a device that receives the locally generated content may not have access to the key management operation and/or the CA encryption technology that may be used to encrypt MVPD content (e.g., at a video aggregation center). Additionally, if the key generation and encryption technology that is used to encrypt MPVD content were stored locally (e.g., on a device and/or system that receives the locally generated content), unauthorized users (e.g., third party bad actors) may be more readily able to access this information (e.g., compared to accessing this information within a video aggregation center). The present disclosure addresses the need to encrypt locally generated content in the same (or similar) manner than that which is used to encrypt MPVD content.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

FIG. 1 is a schematic diagram of an illustrative architecture for providing local video insertion encryption, in accordance with one or more example embodiments of the disclosure.

A consumer may be provided with a variety of services by a service provider. For example, a service provide may provide one or more of video services, data services, voice services, home security services, billing services, application services, web services, and the like. In providing these services, a sending entity (e.g., a service provider, such as an MVPD) may send encrypted content to a receiving entity (e.g., a consumer). A consumer may access content distributed in connection with the provision of services via one or more user devices located at one or more of premises 102. The user devices may include any suitable processor-driven device including, but not limited to, a mobile device or a non-mobile, e.g., a static, device. For example, the user devices may include, a digital set-top box, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

A consumer may communicate with a service provider (e.g., by a MVPD) via one or more network(s) 110 (e.g., a cable access network, the Internet, etc.) to receive one or more services. For example, a consumer may access content via a cable access network for carrying downstream and upstream data between a head end or hub and a user device (e.g., a digital set-top box and/or a cable modem located at customer premises 102). As noted above, the MVPD may encrypt information that is sent to a receiver (e.g., the consumer) in the course of provision of the network-based services. For example, an MVPD may provide one or more of video services, data services, voice services, home security services, billing services, application services, web services, and the like. Information that is sent to a receiver (e.g., a customer of a service provider) may be encrypted in order to ensure that only authorized users are allowed access to the provided service.

Various types of encryption protocols may be used to encrypt data. For example, data may be encrypted using symmetric encryption or asymmetric encryption. Symmetric encryption includes the encryption of information wherein both the sender and the receiver share the same key (or wherein both the sender and the receiver have different keys, but the different keys are related in a known, computable way). In other words, symmetric encryption leverages that both the sender and the receiver have access to a shared secret (e.g., a key) used to encrypt the shared data. No other value other than the key will allow decryption back to the original information.

When a sender wants to send information (e.g., data) to a receiver using symmetric encryption, the sender can encrypt the information using the shared key and a symmetric key encryption algorithm. Examples of symmetric key encryption algorithms include the Data Encryption Standard (DES), the Advanced Encryption Standard (AES), and the like. After receiving encrypted data, the receiver can use the known key to decrypt the encrypted data and obtain the information sent by the sender.

Asymmetric encryption includes the encryption of information using pairs of keys, including a public key, which may be exposed to the public (e.g., disseminated widely), and a private key, which may be known only to the owner. In an asymmetric encryption scheme, when a sender want to send information (e.g., data) to a receiver, the sender can encrypt the information using the receiver's public key. After receiving the encrypted data, the receiver can use the receiver's private key to decrypt the encrypted data and obtain the information sent by the sender.

Locally generated content may be generated that is additional to MVPD content. There is a need to encrypt this locally generated content in the same manner and/or in a manner similar to how the MVPD content is encrypted. MVPD content that is provided by a MVPD may be encrypted using a key management operation. In some embodiments, MVPD content may be encrypted at an MVPD's video aggregation center 114. Encrypted MVPD content may be transmitted from a video aggregation center 114 to one or more authorized customers of the MVPD (e.g., via network(s) 110, such as a cable access network, the Internet, and the like). Authorized users may be able to decrypt the received encrypted MVPD content in order to access the MVPD content. That is, authorized users may be granted conditional access (CA) by CA encryption technology used by the MVPD. As noted above, one or more customers of an MVPD may desire to insert locally generated content into a received encrypted MVPD content stream. For example, an authorized user may want to insert locally generated security footage (e.g., captured at a location proximate to and/or associated with the authorized user, such as one or more of premises 102) into encrypted MVPD content.

CA encryption may allow a device (e.g., a server) to encrypt content (e.g., MVPD content, such as audio/video (A/V) content) using an encryption key and an entitlement control message (ECM). The ECM may contain a decryption key that is configured to allow an end device, such as a digital set-top box, to decrypt the encrypted content. In one embodiment, MVPD content may be encrypted using CA encryption within a secure facility, such as a video aggregation center 114. Note that cloud local CA generator 112 may be located within video aggregation center 114 or may be at a separate location. One or more devices within the secure facility may generate one or more encryption keys and one or more associated ECMs. The present disclosure describes a system that allows the scalable, secure transmission (e.g., by cloud local CA generator 112 via networks 110) of encryption packages (e.g., encryption keys and associated ECMs) to a local device (e.g., a local A/V inserter, such as encryption unit 106).

Figure 2:
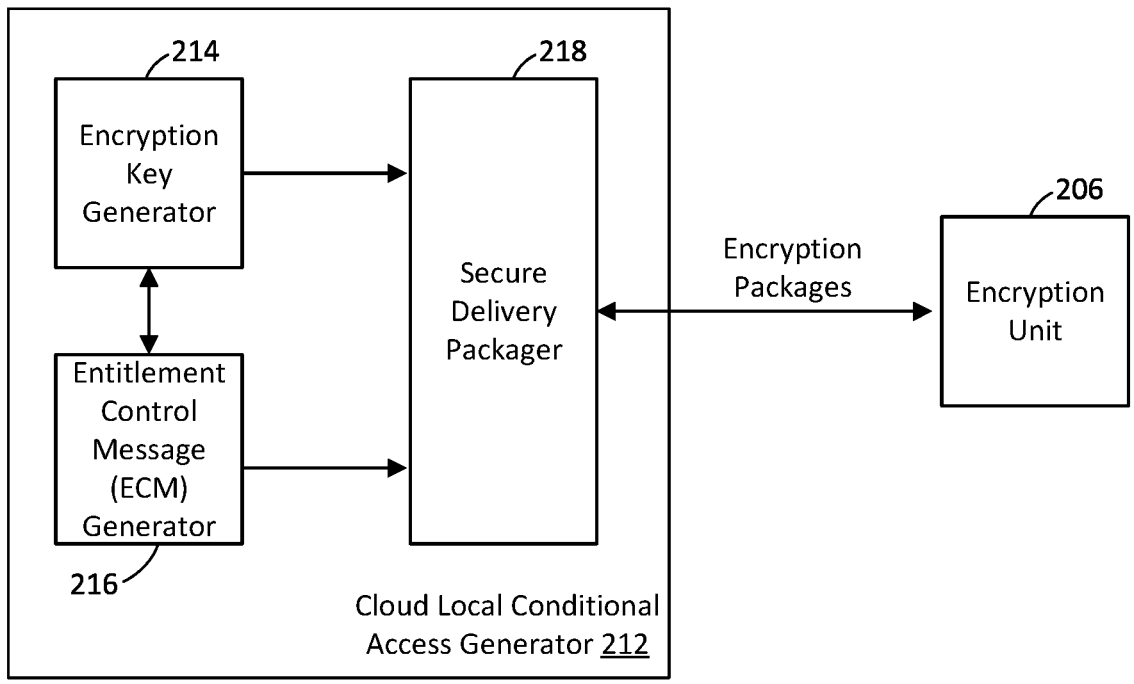
FIG. 2 is a schematic diagram illustrating a system for generating and delivery encryption packages, in accordance with one or more example embodiments of the disclosure.

FIG. 2 is a schematic diagram illustrating a system for generating and delivery encryption packages, in accordance with one or more example embodiments of the disclosure.

In one embodiment, a cloud local CA generator 212 (e.g., the cloud local CA generator 112 of FIG. 1) may communicate with a encryption unit 206 (e.g., the encryption unit 106 of FIG. 1). The cloud local CA generator 212 may communicate with the encryption unit 206 via a network using one or more secure communication protocols, such as Hypertext Transfer Protocol Secure (HTTPS). For example, the cloud local CA generator 212 and the encryption unit 206 may exchange one or more of encryption packages or messages (e.g., requests, status updates, configuration information, and the like) using a secure communication protocol (e.g., Transport Layer Security (TLS), Secure Socket Layer (SSL), or the like). The cloud local CA generator 212 may include one or more components configured to generate and deliver encryption packages. An encryption package may include an encryption key and an associated ECM. An ECM may include a timestamp (e.g., a real-time clock value may be incorporated in the ECM). If the ECM includes a timestamp, the ECM may be synchronized with the encryption key. In one embodiment, a security module may determine not to decrypt the content in response to the timestamp (e.g., in response to a determination that a value of the timestamp is later than a current time and/or a timestamp of a previously received ECM). One or more encryption packages may be transmitted to an encryption unit at a time (e.g., a number of encryption packages may be sent to a encryption unit in response to one or more criteria being met, including any number of encryption packages from 1 to 1000, or more).

In one embodiment, the cloud local CA generator 212 may be located remotely from encryption unit 206. For example, the cloud local CA generator 212 may be located in a secure facility, such as a video aggregation center, that is located some distance away from one or more encryption units. The encryption unit 206 may be located on and/or proximate to the premises of one or more customers (e.g., one or more of customer premises 102 of FIG. 1). In one embodiment, a single encryption unit 206 may perform local encryption for a single customer, a single unit, a single home, and/or a single location. In one embodiment, a single encryption unit 206 may perform local encryption for a plurality of customers (e.g., for a subdivision that includes a plurality of premises associated with one or more respective customers).

In one embodiment, the cloud local CA generator 212 may include one or more components configured to generate and/or deliver encryption packages. For example, the cloud local CA generator 212 may include an encryption key generator 214, an ECM generator 216, and a secure delivery packager 218. The encryption key generator 214 may be configured to generate one or more encryption keys. The encryption key generator 214 may generate one or more A/V encryption keys that meet one or more security requirements of the CA encryption system (e.g., one or more complexity, length, and/or history requirements). The A/V encryption key may be encrypted (e.g., before and/or after being included in and/or appended to an associated ECM). The ECM generator 216 may generate an ECM that is associated with an encryption key generated by the encryption key generator 214. The ECM generated by the ECM generator 216 may include and/or be appended to the encryption key generated by the encryption key generator 214. The secure delivery packager 218 may receive the ECM and the associated encryption key (collectively referred to as an encryption package) and may transmit the encryption package to an encryption unit, singly and/or in association with one or more other encryption packages. The encryption package may be configured for use by an end device (e.g., a set-top box and/or a CableCARD) to allow the end device to conditionally access content (e.g., MVPD content).

In one embodiment, the cloud local CA generator 212 may cause to send one or more encryption packages to the encryption unit 206 in response to one or more criteria. For example, the CA generator 212 may cause to send one or more encryption packages to the encryption unit 206 in response to one or more of: receiving a request from the encryption unit 206, expiration of a timer, and/or an indication that a counter has reached a certain number. The encryption unit 206 may cause to send a request for one or more encryption packages to the cloud local CA generator 212 in response to one or more criteria. For example, the encryption unit 206 may cause to send a request for one or more encryption packages to the cloud local CA generator 212 in response to one or more of: expiration of a timer, an indication that a number of locally stored encryption packages has reached a threshold (e.g., a number of used encryption packages has surpassed a threshold and/or a number of remaining encryption packages has fallen below a threshold), and/or an indication that content (e.g., locally generated unencrypted A/V content) has been received.

Figure 3:
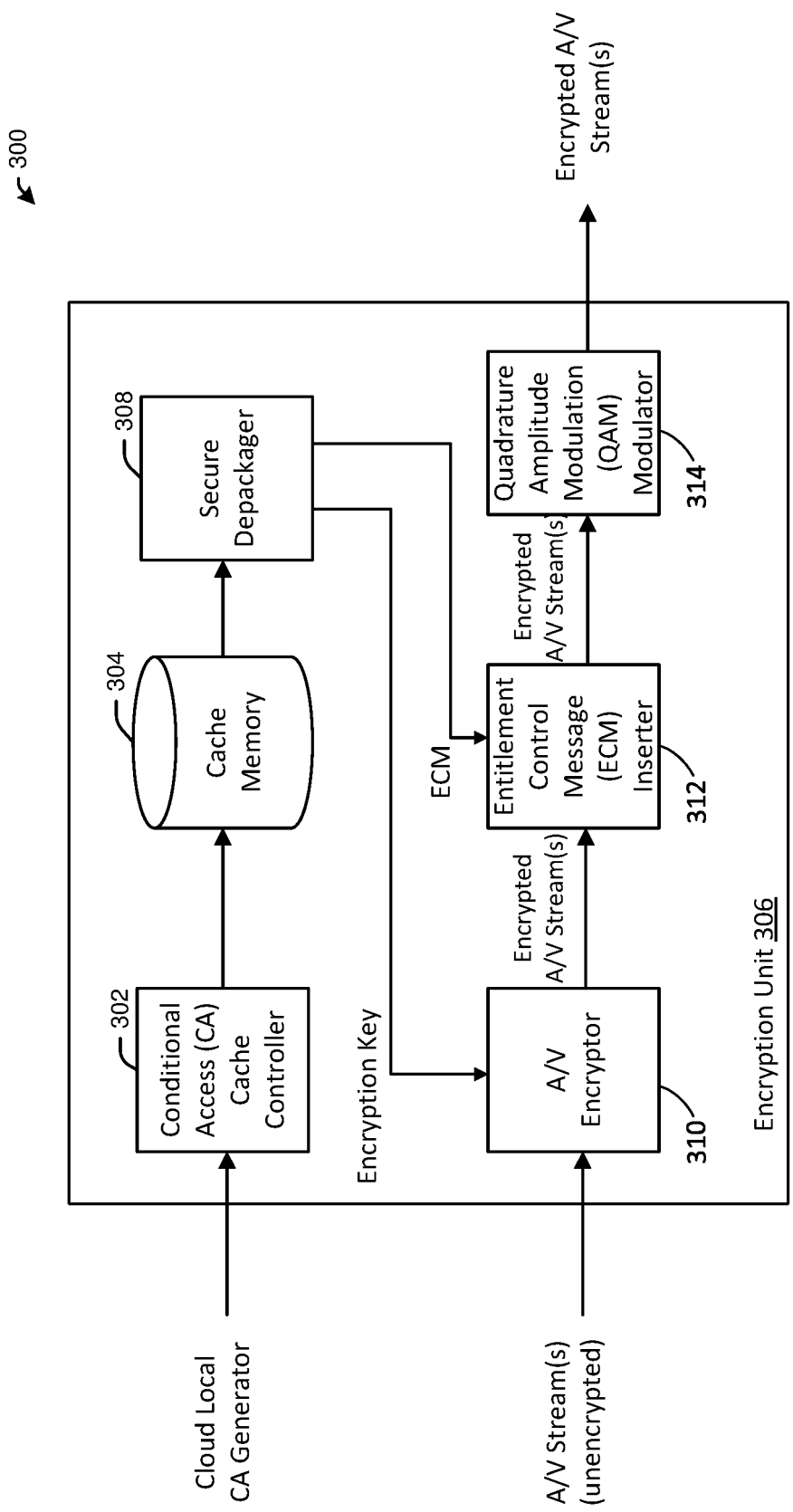
FIG. 3 is a schematic diagram illustrating a block diagram of an encryption unit, in accordance with one or more example embodiments of the disclosure.

FIG. 3 is a schematic diagram illustrating a block diagram of an encryption unit, in accordance with one or more example embodiments of the disclosure.

In one embodiment, an encryption unit 306 (e.g., one or more of the encryption unit 106 of FIG. 1 and/or the encryption unit 206 of FIG. 2) may include one or more components for providing video insertion encryption. For example, the encryption unit 306 may include a CA cache controller 302, a cache memory 304, a secure depackager 308, an A/V encryptor 310, an ECM inserter 312, and a quadrature amplitude modulation (QAM) modulator 314. The encryption unit 306 may receive one or more encryption packages from a cloud local CA generator, such as cloud local CA generator 112 of FIG. 1 and/or cloud local CA generator 212 of FIG. 2. The encryption unit 306 may store one or more of the received encryption packages in the cache memory 304. The encryption unit 306 may monitor the cache memory 304 and may store encryption packages in the cache memory 304 using the CA cache controller 302. For example, the CA cache controller 302 may cause to send an indication to the encryption unit 306 that a number of encryption packages store in the cache memory 304 has fallen below a threshold. In other words, the CA cache controller 302 may ensure that the encryption unit 306 always has stored within the cache memory 304 a sufficient number of encryption packages for operation. The encryption unit 306 may cause a request for additional encryption packages to be sent to a cloud local CA generator based at least in part on the indication.

The encryption unit 306 may receive content, such as an A/V stream, that is unencrypted. The encryption unit 306 may retrieve an encryption package from the cache memory 304 and use the encryption package to encrypt the received content. For example, based at least in part on an indication that received content is to be encrypted, the secure depackager 308 may retrieve an encryption package from the cache memory 304 and extract an encryption key and an associated ECM from the encryption package. The secure depackager 308 may perform one or more operations on the encryption package, including, for example, decrypting the encryption package and/or authenticating the encryption package. The secure depackager 308 may send the encryption key to the A/V encryptor 310. The A/V encryptor 310 may use the encryption key to encrypt the unencrypted content. The secure depackager 308 may send the ECM to the ECM inserter 312. The ECM inserter 312 may insert the ECM into the encrypted content. In other words, the ECM inserter 312 may generate an encryption stream that comprises the ECM and the encrypted content. The ECM inserter 312 may send the encrypted stream to the QAM modulator 314. The QAM modulator 314 may encode and transmit the encrypted stream to one or more devices (e.g., a set-top box, such as a set top box located at one or more of consumer premises 102 of FIG. 1).

Illustrative Device Architecture

Figure 4:
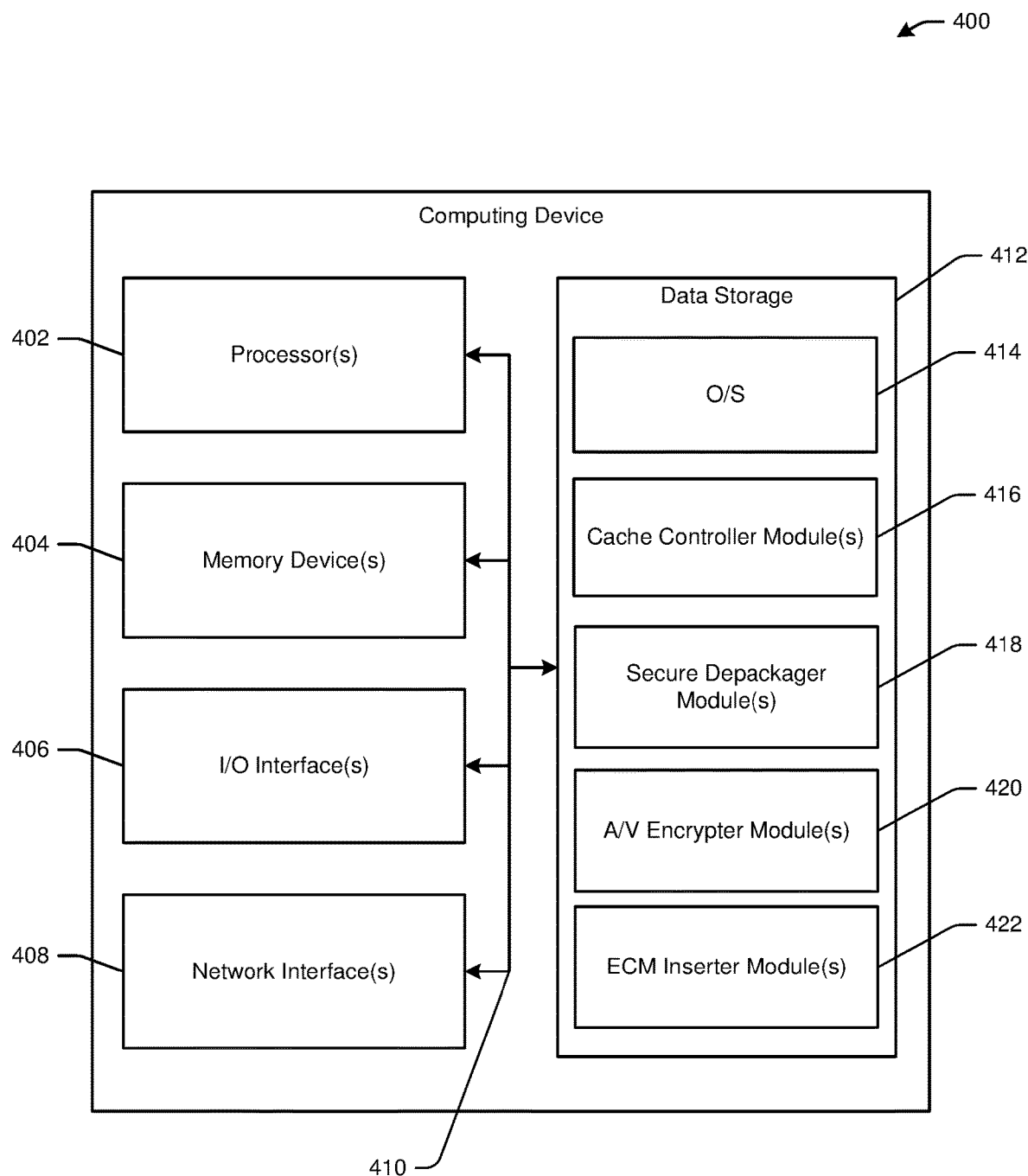
FIG. 4 is a schematic block diagram of an example computing device of a video encryption system, in accordance with one or more example embodiments of the disclosure.

FIG. 4 is a schematic block diagram of an example computing device of a network-based services system, in accordance with one or more example embodiments of the disclosure. In an illustrative configuration, the device 400 (e.g., one or more of the cloud local CA generator 112 and/or the encryption unit 106 of FIG. 1) may include one or more processors (processor(s)) 402, one or more memory devices 404 (generically referred to herein as memory 404), one or more input/output ("I/O") interface(s) 406, one or more network interfaces 408, and data storage 412. The device 400 may further include one or more buses 410 that may functionally couple various components of the device 400. These various components will be described in more detail hereinafter.

The bus(es) 410 may include at least one of a system bus, a memory bus, an address bus, or a message bus, and may permit exchange of information (e.g., data (including computer-executable code), signaling, etc.) between various components of the device 400. The bus(es) 410 may have any of a variety of bus structures including, without limitation, a memory bus or a memory controller, a peripheral bus, an accelerated graphics port, and so forth. The bus(es) 410 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, a Serial Peripheral Interface architecture, and so forth.

The memory 404 of the device 400 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 412 may include removable storage and/or non-removable storage including, but not limited to, magnetic storage, optical disk storage, and/or tape storage. The data storage 412 may include, for example, memory cards, USB flash drives, external hard disk drives, optical discs, and so forth. The data storage 412 may provide non-volatile storage of computer-executable instructions and other data. The memory 404 and the data storage 412, removable and/or non-removable, are examples of computer-readable storage media (CRSM) as that term is used herein.

The data storage 412 may store computer-executable code, instructions, or the like that may be loadable into the memory 404 and executable by the processor(s) 402 to cause various operations to be performed. In certain example embodiments, computer-executable code stored in the data storage 412 may be executable by the processor(s) 402 directly from the data storage 402. The data storage 412 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404, and may ultimately be copied to data storage 412 for non-volatile storage.

More specifically, the data storage 412 may store one or more operating systems (O/S) 414; one or more cache controller module(s) 416; one or more secure de-packager module(s) 418; one or more A/V encryption module(s) 420; and one or more ECM insertion module(s) 422. Any of the modules depicted in FIG. 4 may include computer-executable code, instructions, or the like that may be loaded into the memory 404 for execution by one or more of the processor(s) 402.

The processor(s) 402 may be configured to access the memory 404 and execute computer-executable instructions loaded therein. For example, the processor(s) 402 may be configured to execute one or more computer-executable instructions of the various program modules of the device 400 to cause and/or facilitate various operations to be performed in accordance with one or more embodiments of the disclosure. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to functionality that may be supported by the various program modules depicted as being stored in the data storage 412, the cache controller module(s) 416; the secure de-packager module(s) 418; the A/V encryption module(s) 420; and/or the ECM insertion module(s) 422 may include computer-executable code, instructions, or the like for local video insertion encryption. Additionally, or alternatively, the cache controller module(s) 416 may include computer-executable code, instructions, or the like for monitoring one or more memories and/or generating an indication that additional encryption packages should be requested. The secure depackager module(s) 418 may additionally, or alternatively, include computer-executable code, instructions, or the like for decrypting encryption packages, authorizing encryption packages, extracting encryption keys and ECMs from an encryption package, and/or causing to send the encryption keys and the ECMs. The A/V encrypter module(s) 420 may additionally, or alternatively, include computer-executable code, instructions, or the like for receiving an encryption key, receiving an unencrypted locally generated content stream, encrypting the locally generated content stream using the encryption key, and/or causing to send the encrypted locally generated content stream to the ECM inserter module(s) 422. The ECM inserter module(s) 422 may additionally, or alternatively, include computer-executable code, instructions, or the like for receiving an ECM, receiving an encrypted content stream, and/or generating an encrypted content stream that includes the ECM and the encrypted locally generated content.

Referring now to other illustrative components depicted in FIG. 4 as being stored in the data storage 412, the O/S 414 may be loaded from the data storage 412 into the memory 404 and may provide an interface between other application software executing on the device 400 and hardware resources of the device 400. More specifically, the O/S 414 may include a set of computer-executable instructions for managing hardware resources of the device 400 and for providing common services to other application programs (e.g., managing memory allocation among various application programs). The O/S 414 may include any operating system now known or which may be developed in the future including, but not limited to, any proprietary or non-proprietary operating system (e.g., a Linux based operating system).

Referring now to other illustrative components of the device 400, one or more input/output (I/O) interfaces 406 may be provided that may facilitate the receipt of input information by the device 400 from one or more I/O devices as well as the output of information from the device 400 to the one or more I/O devices. The I/O devices may include, for example, one or more user interface devices that facilitate interaction between a user and the device 400 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth. The device 400 may further include one or more network interfaces 408 via which the device 400 may communicate with any of a variety of other systems, platforms, networks, devices, and so forth. The input/output interface(s) 406 and/or the network interface(s) 408 may include or otherwise facilitate communication via any of a variety of types of serial or parallel ports including, without limitation, an Ethernet port, a USB port, a High-Definition Multimedia Interface (HDMI) port, a Video Graphics Array (VGA) port, a coaxial RF connector (female), and so forth.

The network interface(s) 408 may facilitate communication between the device 400 and one or more other devices via any suitable type of network. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules, applications, computer-executable instructions, code, or the like depicted in FIG. 4 as being stored in the data storage 412 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 400, and/or hosted on other computing device(s) accessible via one or more networks, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 4 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the device 400 may include alternate and/or additional hardware, software, or firmware components beyond those described or depicted without departing from the scope of the disclosure. More particularly, it should be appreciated that software, firmware, or hardware components depicted as forming part of the device 400 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 5:
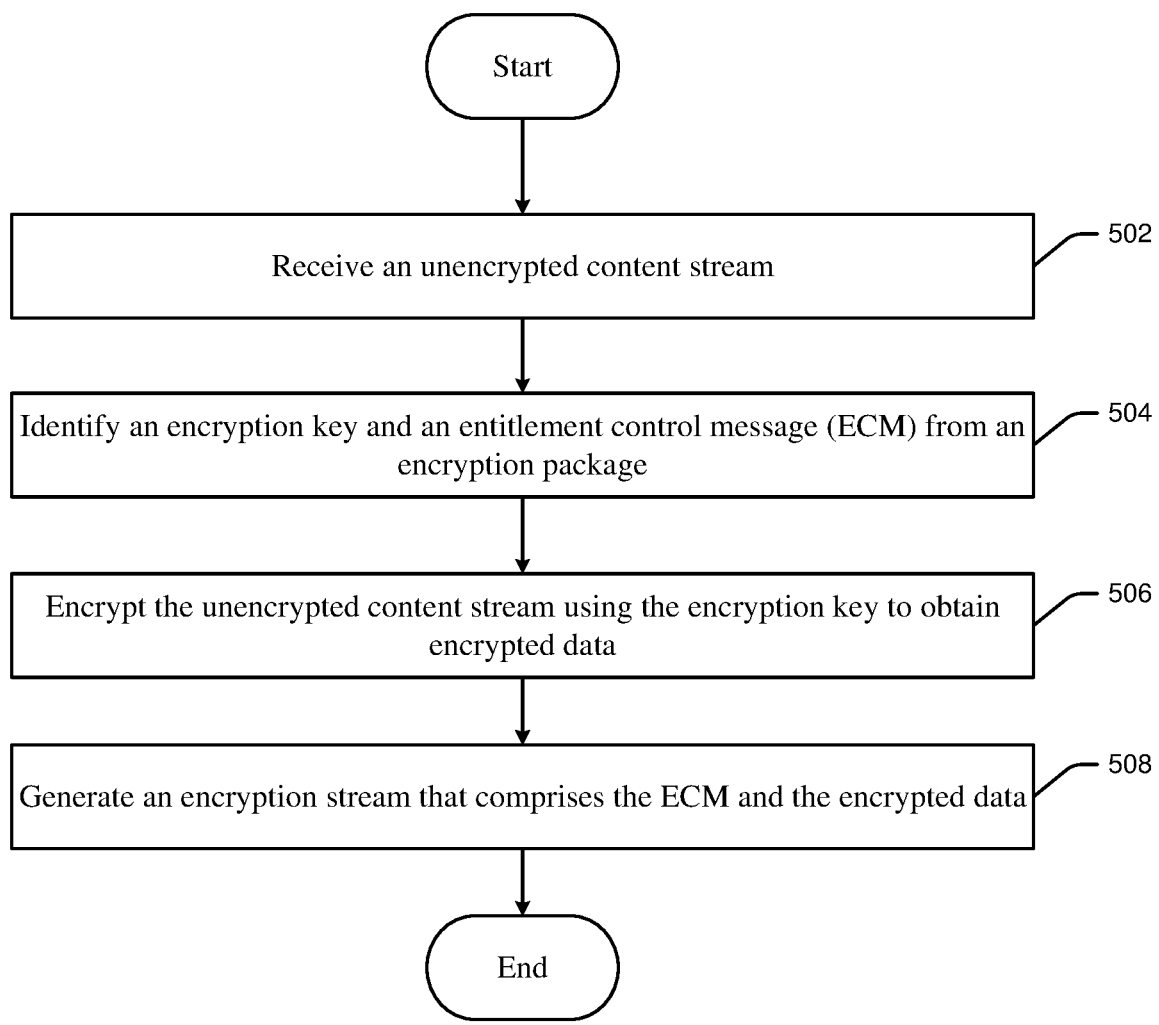
FIG. 5 is a process flow diagram of an illustrative method for encrypting a data stream, in accordance with one or more example embodiments of the disclosure.

FIG. 5 is a process flow diagram of an illustrative method for encrypting a data stream, in accordance with one or more example embodiments of the disclosure.

At block 502, a first device (e.g., the encryption unit 106 of FIG. 1) may receive an unencrypted content stream. The first device may cause to send a request for an encryption package. The request for the encryption package may be sent based at least in part on one or more criteria. The one or more criteria may include a elapsed timer or an indication that a number of remaining and/or unused encryption packages has fallen below a threshold.

At block 504, the first device may identify an encryption key and an entitlement control message (ECM) from an encryption package. The encryption package may comprise an encryption key and an associated ECM. Identifying the encryption key and the ECM may comprise: decrypting the encryption package; and authenticating the encryption package. The first device may store the encryption package in at least one storage medium of the first device. The first device may determine that a number of encryption keys and associated ECMs is below a threshold.

At block 506, the first device may encrypt the unencrypted content stream using the encryption key to obtain encrypted data. The encrypted content stream may be encrypted according to one or more encryption protocols.

At block 508, the first device may generate an encryption stream that comprises the ECM and the encrypted data. The first device may cause to send the encrypted data stream to at least one user device. The first device may determine that a predetermined period of time has elapsed since the sending the request for the encryption package. The first device may cause to send a second request for a second encryption package based at least in part on the determining that a number of encryption keys and associated ECMs is below a threshold and/or on the determining that a predetermined period of time has elapsed since the sending the request for the encryption package. The first device may receive a second unencrypted content stream. The first device may identify a second encryption key and a second ECM from the second encryption package. The first device may encrypt the second unencrypted content stream using the second encryption key to obtain second encrypted data. The first device may generate a second encrypted stream that comprises the second ECM and the second encrypted data.

One or more operations of method 500 may have been described as being performed by one or more components of a system, such as system 100 of FIG. 1, or more specifically, by one or more program modules executing on such components. It should be appreciated, however, that any of the operations of method 500 described as being performed by a particular component or a particular program module executing thereon may be performed by another component or another program module executing thereon. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of method 500 are described in the context of the illustrative system 100, it should be appreciated that the method may be implemented in connection with numerous other architectural and device level configurations.

In addition, it should be appreciated that the operations described and depicted in FIG. 5 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIG. 5 may be performed.

Figure 6:
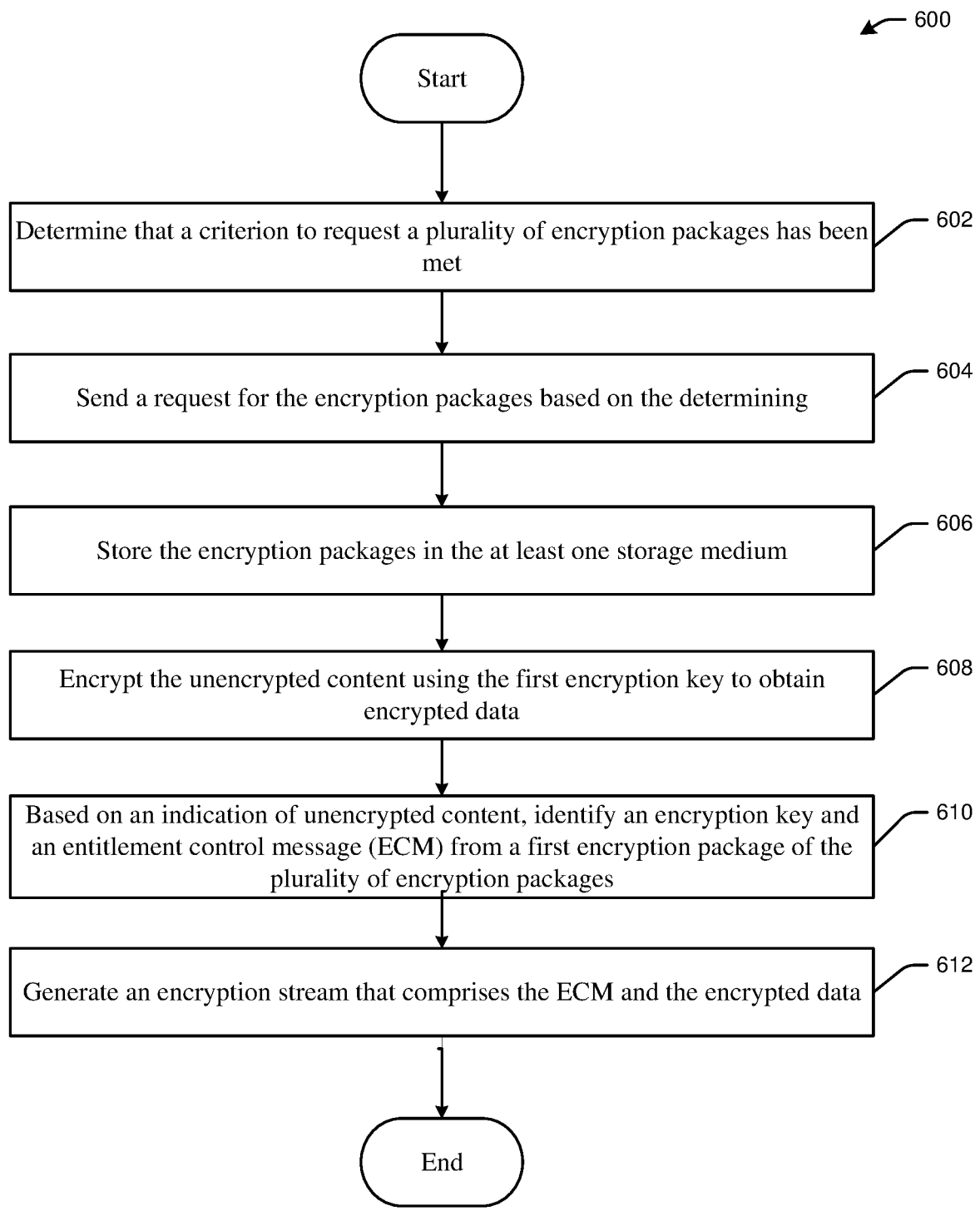
FIG. 6 is a process flow diagram of an illustrative method for encrypting a data stream, in accordance with one or more example embodiments of the disclosure.

FIG. 6 is a process flow diagram of an illustrative method for encrypting a data stream, in accordance with one or more example embodiments of the disclosure.

At block 602, a first device (e.g., the encryption unit 106 of FIG. 1) may determine that a criterion to request a plurality of encryption packages has been met. The criterion may include one or more of: an expired timer, or an indication that a number of encryption packages stored in the memory has fallen below a threshold.

At block 604, the first device may send a request for the encryption packages based on the determining. The first device may be further configured to determine the first encryption package, decrypt the first encryption package, and authenticate the first encryption package.

At block 606, the first device may store the encryption packages in the at least one storage medium. The encryption packages may be received via Hypertext Transfer Protocol Secure (HTTPS).

At block 608, based on an indication of unencrypted content, the first device may identify an encryption key and an entitlement control message (ECM) from a first encryption package of the plurality of encryption packages.

At block 610, the first device may encrypt the unencrypted content using the first encryption key to obtain encrypted data.

At block 612, the first device may generate an encryption stream that comprises the ECM and the encrypted data. The first device may be further configured to cause to send the encryption stream to at least one user device. Based at least in part on a second indication of second unencrypted content, the first device may be further configured to identify a second encryption key and a second ECM from a second encryption package of the plurality of encryption packages, encrypt the second unencrypted content using the second encryption key to obtain second encrypted data, and generate a second encryption stream comprising the second ECM and the second encrypted data.

One or more operations of method 600 may have been described as being performed by one or more components of a system, such as system 100 of FIG. 1, or more specifically, by one or more program modules executing on such components. It should be appreciated, however, that any of the operations of method 600 described as being performed by a particular component or a particular program module executing thereon may be performed by another component or another program module executing thereon. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of method 600 are described in the context of the illustrative system 100, it should be appreciated that the method may be implemented in connection with numerous other architectural and device level configurations.

In addition, it should be appreciated that the operations described and depicted in FIG. 6 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIG. 6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers), data storage (e.g., file management) routines, other common routines and services, etc.), or third-party software components (e.g., middleware, encryption or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may also invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device comprising:
   at least one computer processor; and
   at least one storage medium storing computer-executable code comprising:
   receive an unencrypted content stream;
   identify an encryption key and an entitlement control message (ECM) associated with an encryption package;
   encrypt the unencrypted content stream using the encryption key to obtain encrypted data;
   generate an encryption stream that comprises the ECM and the encrypted data;
   receive a second unencrypted content stream;
   identify a second encryption key and a second ECM from the second encryption package;
   encrypt the second unencrypted content stream using the second encryption key to obtain second encrypted data; and
   generate a second encrypted stream that comprises the second ECM and the second encrypted data.

2. The device of claim 1, wherein the unencrypted content stream is received from a content generation device on a network local to a premises of a customer.

3. The device of claim 1, wherein the identifying the encryption key and the ECM comprises:
   decrypting the encryption package; and
   authenticating the encryption package.

4. The device of claim 1, wherein the computer-executable code further comprises:
   cause to send the encrypted data stream to at least one user device.

5. The device of claim 1, wherein the computer-executable code further comprises:
   cause to send a request for the encryption package;
   store the encryption package in the at least one storage medium;
   determine that a period of time has elapsed since the sending the request for the encryption package; and
   cause to send a second request for a second encryption package.

6. The device of claim 1, wherein the computer-executable code further comprises:
   determine that a number of encryption keys and ECMs is below a threshold; and
   cause to send a request for a second encryption package.

7. A device, comprising:
   at least one computer processor; and
   at least one storage medium storing computer-executable code comprising:
   determine that a criterion to request a plurality of encryption packages has been met;
   send a request for the encryption packages based on the determining;
   store the encryption packages in the at least one storage medium;
   based on an indication of unencrypted content, identify a first encryption key and an entitlement control message (ECM) from a first encryption package of the plurality of encryption packages;
   encrypt the unencrypted content using the first encryption key to obtain encrypted data;
   generate an encryption stream that comprises the ECM and the encrypted data;
   receive a second unencrypted content stream;
   identify a second encryption key and a second ECM from the second encryption package;

encrypt the second unencrypted content stream using the second encryption key to obtain second encrypted data; and generate a second encrypted stream that comprises the second ECM and the second encrypted data.

8. The device of claim 7, wherein the criterion includes one or more of: an expired timer, or an indication that a number of encryption packages stored in the storage medium has fallen below a threshold.

9. The device of claim 7, wherein the computer-executable code further comprises:
determine the first encryption package;
decrypt the first encryption package; and
authenticate the first encryption package.

10. The device of claim 7, wherein the computer-executable code further comprises:
cause to send the encryption stream to at least one user device.

11. The device of claim 7, wherein the encryption packages are received via Hypertext Transfer Protocol Secure (HTTPS).

12. A method comprising:
receiving, by one or more processors, an unencrypted content stream;
identifying, by the one or more processors, an encryption key and an entitlement control message (ECM) from an encryption package;
encrypting, by the one or more processors, the unencrypted content stream using the encryption key to obtain encrypted data;
generating, by the one or more processors, an encryption stream that comprises the ECM and the encrypted data;
receive a second unencrypted content stream;
identify a second encryption key and a second ECM from the second encryption package;
encrypt the second unencrypted content stream using the second encryption key to obtain second encrypted data; and
generate a second encrypted stream that comprises the second ECM and the second encrypted data.

13. The method of claim 12, wherein the encryption package comprises the encryption key and the ECM.

14. The method of claim 12, wherein the identifying the encryption key and the ECM comprises:
decrypting the encryption package; and
authenticating the encryption package.

15. The method of claim 12, further comprising:
causing to send, by the one or more processors, the encrypted data stream to at least one user device.

16. The method of claim 12, further comprising:
causing to send, by the one or more processors, a request for the encryption package;
storing, by the one or more processors, the encryption package;
determining, by the one or more processors, that a predetermined period of time has elapsed since the sending the request for the encryption package; and
causing to send, by the one or more processors, a second request for a second encryption package based at least in part on the determining.

17. The method of claim 12, further comprising:
determining, by the one or more processors, that a number of encryption keys and ECMs is below a threshold; and
causing, by the one or more processors, to send a request for a second encryption package.

* * * * *